United States Patent [19]
Baird et al.

[11] Patent Number: 5,621,041
[45] Date of Patent: Apr. 15, 1997

[54] COMPATIBLE LIQUID CRYSTAL POLYMER/POLYOLEFIN BLENDS

[75] Inventors: Donald G. Baird; Arindam Datta, both of Blacksburg, Va.

[73] Assignee: Center for Innovative Technology, Herndon, Va.

[21] Appl. No.: 686,603

[22] Filed: Apr. 17, 1991

[51] Int. Cl.$^6$ .......................... C08L 23/02; C08L 67/03; C08L 67/04; C08L 77/12
[52] U.S. Cl. ............................... 525/66; 525/64; 525/68
[58] Field of Search ................... 525/64, 68, 66

[56] References Cited

U.S. PATENT DOCUMENTS

| | | | |
|---|---|---|---|
| 3,414,551 | 12/1968 | Reid et al. | 260/88.2 |
| 4,228,218 | 10/1980 | Takayanagi | 525/58 |
| 4,368,295 | 1/1983 | Newton | 525/166 |
| 4,728,698 | 3/1988 | Isayev | 525/439 |
| 4,734,470 | 3/1988 | Kawabata et al. | 525/537 |
| 4,824,736 | 4/1989 | Ehrig et al. | 428/623 |
| 4,869,967 | 9/1989 | Inoue et al. | 428/480 |
| 4,968,539 | 11/1990 | Aoyagi et al. | 428/481 |
| 5,043,400 | 8/1991 | Tsuruta | 525/437 |

FOREIGN PATENT DOCUMENTS

| | | | |
|---|---|---|---|
| 0340655 | 8/1989 | European Pat. Off. | C08L 101/00 |

OTHER PUBLICATIONS

B. C. Auman et al, Polymer, 1988, vol. 29 pp. 938–949.

Gaylord, Compatibizing Agents: Structure and function in polyblends, J. Macromol. Sci–Chem, A26(8), pp. 1121–1129, 1989.

Ide et al., Studies on polymer blends of Nylon–6 and poystyrene using the reaction of a polymer, J. App. Pol. Sci., vol. 18, pp. 963–974, 1974.

Dagli et al., Modification of nylon–6/polypropylene blends through reactive compatibization, ANTEC '90, pp. 1924–1928.

New polypropylenes, Plastics Engineering, Sep. 1990.

Improved TPO's, Plastics Engineering, Sep. 1990.

*Primary Examiner*—Patricia A. Short
*Attorney, Agent, or Firm*—Whitham, Curtis, Whitham & McGinn

[57] ABSTRACT

Maleated polyolefins such as maleated polypropylene, maleated polyethylene, and the like can be used as compatibilizing agents for producing a polymer alloy of polyolefins, such as polypropylene, and liquid crystal polymers. The polymer alloys have improved stiffness, strength, and surface appearance characteristics.

15 Claims, 8 Drawing Sheets

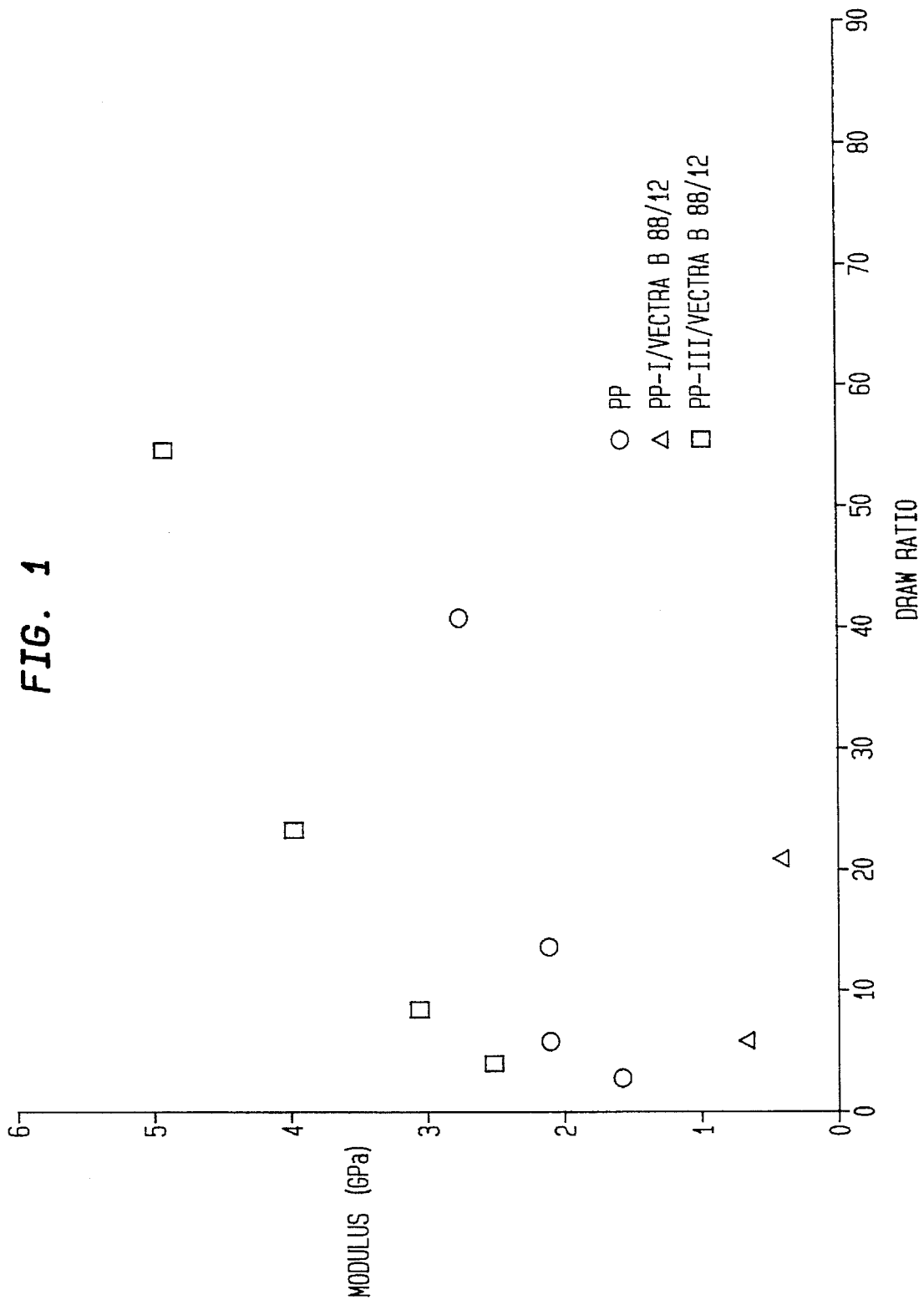

FIG. 4

| MATERIALS | TENSILE MODULUS GPa | TENSILE STRENGTH MPa | FLEX MODULUS GPa |
|---|---|---|---|
| PP | 1.354 (0.075) | 26.89 (1.10) | 1.272 (0.068) |
| PP-I/VECTRA B 80/20 | 2.553 (0.169) | 24.04 (1.14) | 2.255 (0.220) |
| PP-III/VECTRA B 80/20 | 3.209 (0.262) | 34.01 (1.06) | 2.919 (0.410) |
| PP-I/VECTRA B 70/30 | 3.003 (0.289) | 19.71 (0.59) | (2.736) (0.121) |
| PP-III/VECTRA B 70/30 | 4.101 (0.401) | 37.55 (3.97) | 3.857 (0.107) |

FIG. 8

| MATERIALS | TENSILE MODULUS GPa | TENSILE STRENGTH MPa |
|---|---|---|
| PP | 1.354 (0.075) | 26.89 (1.10) |
| PP-I/VECTRA A 80/20 | 2.555 (0.216) | 27.70 (1.06) |
| PP-III/VECTRA A 80/20 | 3.059 (0.185) | 33.23 (0.70) |
| PP-I/VECTRA A 70/30 | 2.868 (0.280) | 28.26 (1.15) |
| PP-III/VECTRA A 70/30 | 3.791 (0.299) | 34.45 (1.23) |

COMPATIBLE LIQUID CRYSTAL POLYMER/POLYOLEFIN BLENDS

BACKGROUND OF THE INVENTION

1. Field of the Invention

The subject invention is generally related to blends of polypropylene with liquid crystalline polymers having improved strength and surface characteristics and, more particularly, to compositions containing polypropylene, liquid crystal polymers, and a compatibilizing agent.

2. Description of the Prior Art

Polypropylene is an inexpensive plastic used in a wide variety of applications; however, polypropylene lacks the stiffness and strength required for many applications in which its use would be desirable. Hence, much effort has been put forth in combining polypropylene with other materials to make the polypropylene more suitable for use in such products. It is well known that liquid crystalline polymers can be blended with polypropylene to yield products with improved stiffness. In the past, liquid crystalline polymers have been blended with polypropylene in the same extruder; however, this procedure has proved to be inadequate for many liquid crystalline polymers. Because liquid crystal polymers typically melt at a much higher temperature than polypropylene, the polypropylene is subjected to temperatures in the extruder which are needed to melt the liquid crystal polymer, but which cause polypropylene to degrade. In addition, it is generally desirable to maintain the viscosity of the liquid crystalline polymer below that of the matrix polymer (e.g., polypropylene) in order to form and stabilize certain desirable morphologies. If the temperature in the extruder is maintained to melt the liquid crystalline polymers, then the viscosity of the polypropylene may be lower than that of the liquid crystalline polymer, a characteristic which is not generally desirable. Furthermore, if additional processing of the melt stream is required, as would be the case for film blowing or sheet extrusion, the melt strength of the polypropylene/liquid crystalline polymer blend would be poor if the temperature of the stream is too high (e.g. greater than 280° C.).

European Patent Application 340,655 to Himont Italia shows technology in polymer blending which overcomes problems associated with combining materials that have incompatible thermal processing temperatures. Liquid crystalline polymer fibers are formed in situ in polypropylene by injecting a stream of molten liquid crystal polymer into molten polypropylene at a point which may be near the outlet of the polypropylene extruder (injection could also occur at a point as far back as 15 times the diameter).

A problem with any process in which liquid crystal polymers and polypropylene are blended together is that liquid crystal polymers are generally incompatible with polypropylene. By incompatibility it is meant that because the polymers are chemically quite different, there is a large energy difference at any interface between the polymers. This results in large interfacial surface tension which prevents a drop of one polymer from being finely dispersed in another polymer upon mixing. The large difference in surface energy also inhibits the diffusion of polymer molecules through the interface between two polymers, thereby causing poor dispersion and consequent poor adhesion between the components. In general, manifestations of incompatibility between two polymers in a blend include delamination and separation of the components, poor surface appearance, reduced strength, brittleness, and poor impact properties.

Compatibilizing agents allow one to create polymer blends which possess properties that are different from and are generally not attainable from either of the two components of the blend. Block or graft copolymers possessing segments with chemical structures or solubility parameters which are similar to those of the polymers being blended are effective compatibilizing agents. The compatibilizing agents can be formed separately then added to the polymers that are being compatibilized. Alternatively, the compatibilizing agents can be generated in situ by a reaction between the coreactive functional groups on the polymers. Whether the compatibilizing agent is preformed or generated in situ, the bonding between the polymer chains is generally covalent, ionic or hydrogen. The compatibilizing agent acts as a surfactant in lowering surface tension, promoting finer dispersion and improving interfacial adhesion between the phases. There are a wide variety of known compatibilizing agents and their functions are discussed generally by Gaylord in J. Macromol. Sci.-Chem., A26(8), pp. 1211–1229 (1989).

The maleic anhydride/polypropylene graft polymer, generally known as maleated polypropylene, is a well known compatibilizing agent. As early as 1974, Ide et al. in J. App. Pol. Sci. Vol. 18, pp. 963–974 (1974) disclosed that maleated agent between nylon 6 and polypropylene. With respect to the polypropylene/nylon 6 combination, a graft polymer is formed between polypropylene and nylon 6 by means of a reaction between maleic anhydride substituents of the maleated polypropylene and the amine group of the nylon 6. The polypropylene/nylon 6 blend with the maleated polypropylene had increased tensile strength, elongation at break and impact strength relative to the polypropylene/nylon 6 blend without the maleated polypropylene. Furthermore, a marked improvement in the dispersability of the two components was observed on addition of the maleated polypropylene. As mentioned above, one of the most important reasons to compatibilize polypropylene and nylon 6 in the blend is to improve the impact properties. As the modulus (which reflects stiffness) of the polypropylene is in the range of 1.3 gigaPascals (GPa) and that of the nylon 6 is in the range of 2.0 GPa, the addition of nylon 6 to polypropylene should not affect the stiffness of the polypropylene.

There is a need for an improved polymer alloy which combines the strength and stiffness of liquid crystal polymers with the low cost of polyolefins such as polypropylene and polyethylene. Unlike prior art combinations of liquid crystal polymers and polypropylene which merely have relatively increased stiffness, there is a need for a polymer alloy which also has increased strength. Furthermore, there is a need for a liquid crystalline polymer/polypropylene blend which has better stiffness properties than that which has been achieved by the prior art combinations. In addition, there is a need for a polymer alloy which has an acceptable surface appearance which would allow its use in applications that are subject to close consumer scrutiny such as automobile body parts and the like.

SUMMARY OF THE INVENTION

It is an object of this invention to provide a polymer alloy which combines liquid crystal polymers and polyolefins such as polypropylene with a compatibilizing agent that has improved strength, stiffness and surface appearance characteristics.

It is another object of this invention to provide a polymer alloy of liquid crystal polymers and a polyolefin such as polypropylene which utilizes a maleated polyolefin such as maleated polypropylene as a compatibilizing agent.

It is still another object of this invention to use maleated polyolefins as a compatibilizing agents when polyolefins are reinforced with liquid crystal polymer fibers on an in situ basis.

According to the invention, maleated polypropylene has been shown to be an effective compatibilizing agent for polypropylene and liquid crystal polymers. Blends of polypropylene and liquid crystal polymers which are compatibilized with maleated polypropylene result in products that have improved strength relative to products made from blends without the compatibilizing agent. Because of the formation of finer fibrils with higher aspect ratios when liquid crystalline polymers are compatibilized with maleated polypropylene, the stiffness is improved also. Furthermore, blends of liquid crystal polymers and polypropylene which have been compatibilized with maleated polypropylene have superior surface appearance characteristics.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a graph of the tensile moduli of strands of polypropylene, strands of a mixture including 88 weight percent polypropylene and 12 weight percent Vectra B (PP-I/Vectra B 88/12), and strands of a mixture including 79.2 weight percent polypropylene, 8.8 weight percent maleated polypropylene and 12 weight percent Vectra B (PP-III/Vectra B 88/12), at different draw ratios;

FIG. 4 is a table showing the measured mechanical properties of polypropylene and polypropylene/liquid crystal polymer (Vectra B) blends, with and without maleated polypropylene;

FIG. 8 is a table showing the measured mechanical properties of polypropylene and polypropylene/liquid crystal polymer (Vectra A) blends, with and without maleated polypropylene.

DETAILED DESCRIPTION OF THE PREFERRED EMBODIMENT OF THE INVENTION

Figure 2A:
FIGS. 2a–b are scanning electron micrographs of strands of the PP-I/Vectra B 88/12 blend (polypropylene and Vectra B without maleated polypropylene) at draw ratios of 39 and 11, respectively.

Blends of polypropylene and liquid crystal polymers with and without maleated polypropylene have been prepared. The polypropylene used was isotactic. Polypropylene is commercially available from a variety of sources such as Himont, Eastman, Phillips, Dutch State Mines, etc. Maleated polypropylene is maleic anhydride grafted polypropylene (MAH-PP) and its synthesis has been reported by Ide et al. in J. Appl. Polm. Sci., Vol. 18, pp. 963–974, 1974. Maleated polypropylene is also commercially available from a variety of sources such as Himont, Eastman, Quantum, etc. This invention should be readily practicable with other polyolefins such polyethylene and using other maleated polyolefins such as maleated polyethylene. The liquid crystal polymers which can be used include the copolyester based on 2-hydroxy-6-napthoic acid (HNA) and parahydroxybenzoic acid (HBA) which is known as Vectra A; the copolyester based on HBA and polyethylene terepthalate (PET); the copolyester based on terepthalic acid (TPA), hydroquinone (HQ), and phenylhydroquinone (PHQ), and modifications of this system (e.g., with tert-butyl hydroquinone or ethylphenyl hydroquinone); and the copolyester based on TPA, ethylphenyl hydroquinone (EPHQ) and PHQ. A polyester (coamide) believed to be based on HNA, TPA, and 4-hydroxy acetanilide called Vectra B can also be used. These thermotropic liquid crystalline polymers are all well known and are not, in and of themselves, the subject matter of this invention.

Depending on whether the liquid crystal polymer which is selected for blending with the matrix polyolefin (e.g., polypropylene) has a thermally overlapping processing temperature range with the matrix polyolefin, different methods for fabricating the blends have been developed. For example, a processing temperature range is thermally overlapping where molten polypropylene can be processed with molten liquid crystalline polymer (which typically melts at a higher temperature than polypropylene) without the polypropylene degrading. The processing temperature range does not overlap where the temperature required for the molten liquid crystal polymer is too high for the polypropylene melt.

If the thermal processing temperatures ranges are overlapping, the blends are made by first premixing the matrix polypropylene (e.g., Himont Profax 6823) with the maleic anhydride grafted polypropylene (e.g., Himont Hercoprime G) to form pellets which are later blended with the liquid crystal polymer and extruded therewith. Premixing is performed first because of the low viscosity of polypropylene relative to liquid crystalline polymers. The mixture of polypropylene/maleated polypropylene can be in the range 3–30% by weight of maleated polypropylene. The mixture is prepared by tumbling the two components (e.g., polypropylene pellets and maleated polypropylene powder) together and then feeding them into a single screw extruder (e.g., 1.0 inch diameter and length to diameter ratio (L/D) equal to 20). The single screw extruder can have three zones where the first zone is used for solids conveying, the second zone is used for melting, and the third zone is used for melt pumping. The temperatures in the three zones are individually controllable. Preferably the first zone is set to 135° C. and the next two zones to 235° C.; however, the temperatures for each of the zones can be varied considerably depending on the nature of the materials and the needs of the manufacturer. The molten blend of polypropylene and maleated polypropylene is then extruded through a capillary die (e.g., diameter of 3.175 mm, L/D=10), quenched in an ice water bath, and continuously pelletized. Next, the polypropylene/maleated polypropylene blended pellets are blended with the liquid crystal polymer. The liquid crystal polymer is chosen to meet the needs of the manufacturer. The polypropylene/maleated polypropylene pellets and pellets of the liquid crystal polymer are tumbled together in a predetermined ratio ranging between 1–99% by weight of the liquid crystal polymer. The mixed pellet composition is then fed into a single screw extruder, twin screw extruder, or injection mold unit for mixing. The temperatures of the second and third zones (melting and melt pumping) of the extruders or the injection molder are set at temperatures above the melting point of the particular liquid crystal polymer. Because of the generally high melting points of liquid crystal polymers, the melting point of the liquid crystal polymer is typically always higher than the melting point of the polypropylene/maleated polypropylene blend. The final products, such as injection molded shapes, drawn films or nets or strands, or extruded geometries (tubes), are obtained by well known processing techniques.

If the thermal processing temperature ranges do not overlap, the blends are made by joining a molten polyolefin/maleated polyolefin (e.g., polypropylene/maleated polypropylene) stream from one extruder with a molten liquid crystal polymer stream from another extruder. As described above, the matrix polypropylene (e.g., Himont Profax 6823) is tumbled together with the maleated polypropylene (e.g., Himont Hercoprime G) in a mixture comprised of 3–30% be weight maleated polypropylene and extruded from a single screw extruder or the like (e.g., 1.0 inch diameter and L/D=24). Preferably the first zone is set to 135° C., the second zone is set to 190° C., and the third zone is set to 200° C.; however, the temperatures for each of the zones can be varied considerably depending on the nature of the materials and the needs of the manufacturer. The liquid crystal polymer is melted separate from the polypropylene/maleated polypropylene in a second extruder in which the melting zone is set at a temperature 20°–40° C. above the melting point (Tm) of liquid crystal polymer and the melt conveying or pumping zone is set at a temperature 10°–20° C. higher than the Tm of the liquid crystal polymer. The molten polypropylene/maleated polypropylene extrudate stream is then joined with molten liquid crystal polymer extrudate stream and fed into a mixing head (e.g., a 0.5 inch inner diameter static mixer containing at least nine mixing elements where the mixing elements have an L/D=1.7). The static mixer is maintained at temperatures between 200° and 250° C. depending on the particular liquid crystal polymer. The outlet stream from the static mixer is then fed to an appropriate die. Depending on the selection of the die and downstream equipment, the final product may be drawn strands, nets, films, or tubes which can be blown into films or blow molded.

The advantage of immediately processing the stream of polyolefin/maleated polyolefin/liquid crystal polymer by extrusion through a die or the like, especially in the process described above where the thermal processing temperatures of the liquid crystal polymer and the matrix polyolefin do not have overlapping thermal processing ranges, is that the liquid crystal polymer is more pliable while it is in its molten state and can be structured according to the needs of the manufacturer. However, not all plastics facilities are capable or are desirous of performing the above-described mixing processes. Hence, it is anticipated that the stream leaving the static mixer can be pelletized, as by quenching with cold water or the like, and the pellets can be processed later using methods which are commonly used for thermoplastics. If the thermal processing ranges of the liquid crystal polymer and the polyolefin matrix do not overlap, the pellets would be processable later at a temperature below the melting point of the liquid crystal polymer but above the melting point of the polyolefin using thermoplastic methodologies.

As an alternative to the above-described mixing processes, polypropylene/maleated polypropylene pellets may be combined with the liquid crystal polymer using the technique discussed in European Patent Application 340,655 to Himont Italia, which is herein incorporated by reference. The mixing procedure described in the Himont Patent Application is directed to mixing liquid crystal polymers with incompatible temperature processing ranges with that of the matrix polymer (e.g., polypropylene).

EXAMPLE 1

Strands of polypropylene and Vectra B 950 (a liquid crystal polymer believed to be based on HNA, TPA and 4-hydroxy acetanilide) were made with and without maleated polypropylene using the mixing process described above for mixtures with incompatible thermal processing ranges. In the blend of Vectra B 950 with polypropylene/maleated polypropylene, the polypropylene/maleated polypropylene blend had a weight ratio of 90% polypropylene and 10% maleated polypropylene. Vectra B 950 was melted in an extruder with the melting and melt conveying zones set to 325° C. and 300° C., respectively. The flow rates of the two extruders were controlled to obtain a mixture of 12% by weight of Vectra B 950 and either 88% by weight of polypropylene/maleated polypropylene which is denoted as PP-III/Vectra B 88/12 or 88% by weight of polypropylene alone which is denoted as PP-I/Vectra B 88/12. The melted stream from the static mixer was fed to a capillary die of 3.17 mm in diameter and an L/D=1. The extrudate from the die was quenched and simultaneously drawn at different draw ratios into strands of different diameters.

FIG. 1 shows a graph of the tensile moduli of strands of polypropylene, PP-I/Vectra B 88/12, and PP-III/Vectra B 88/12 at different draw ratios. The tensile modulus of the strands was measured in accordance with standard methods ASTM 3379. The draw ratios were calculated according to the ratio of the cross-sectional area of the strand relative to the cross-sectional area of the capillary die (draw ratios relate to the relationship of the velocity of the die exit and the uptake velocity of the stream). The tensile modulus of polypropylene strands does improve on the addition of Vectra B 950; however, FIG. 1 shows that the tensile modulus of the polypropylene/Vectra B strand combination is enhanced further by the addition of maleated polypropylene as evidenced by the higher moduli of PP-III/Vectra B 88/12 strands as compared to those of PP-I/Vectra B 88/12 strands at all the measured draw ratios.

Figure 2B:
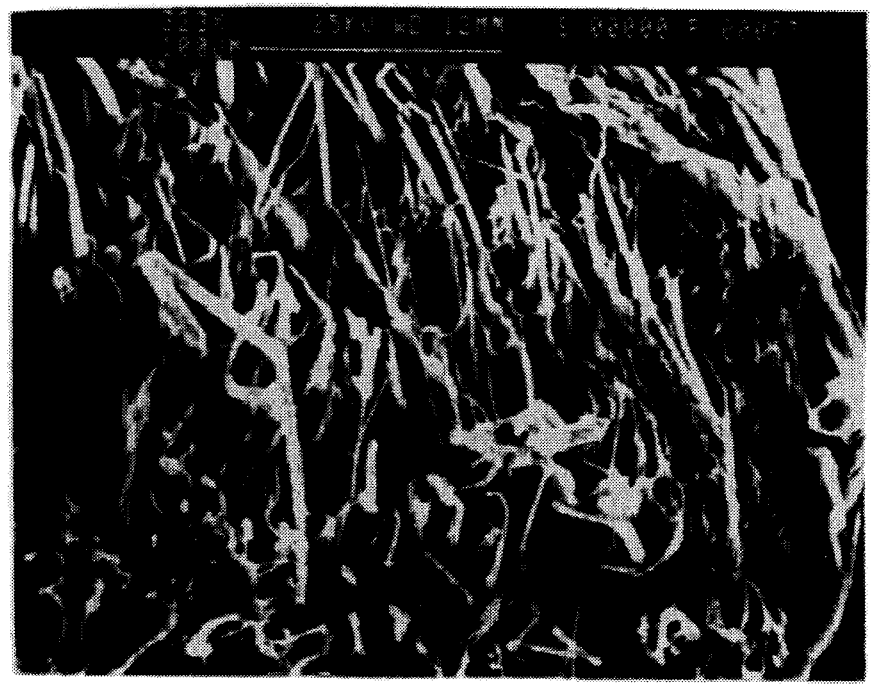
Figure 3A:
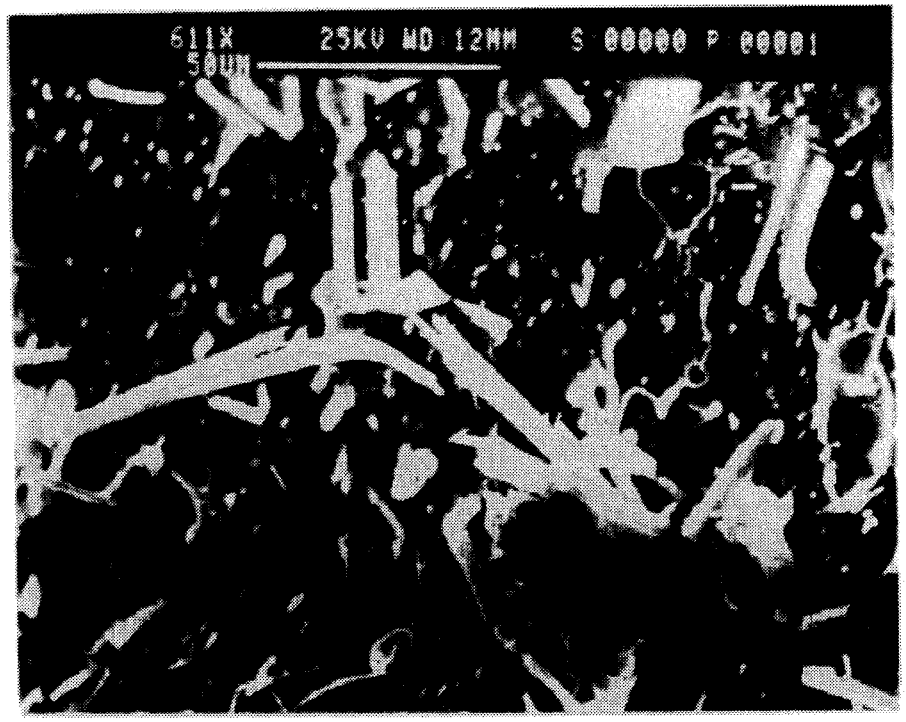
FIGS. 3a–b are scanning electron micrographs of strands of the PP-III/Vectra B 88/12 blend (polypropylene plus Vectra B plus maleated polypropylene) at draw ratios of 43 and 10, respectively.
Figure 3B:
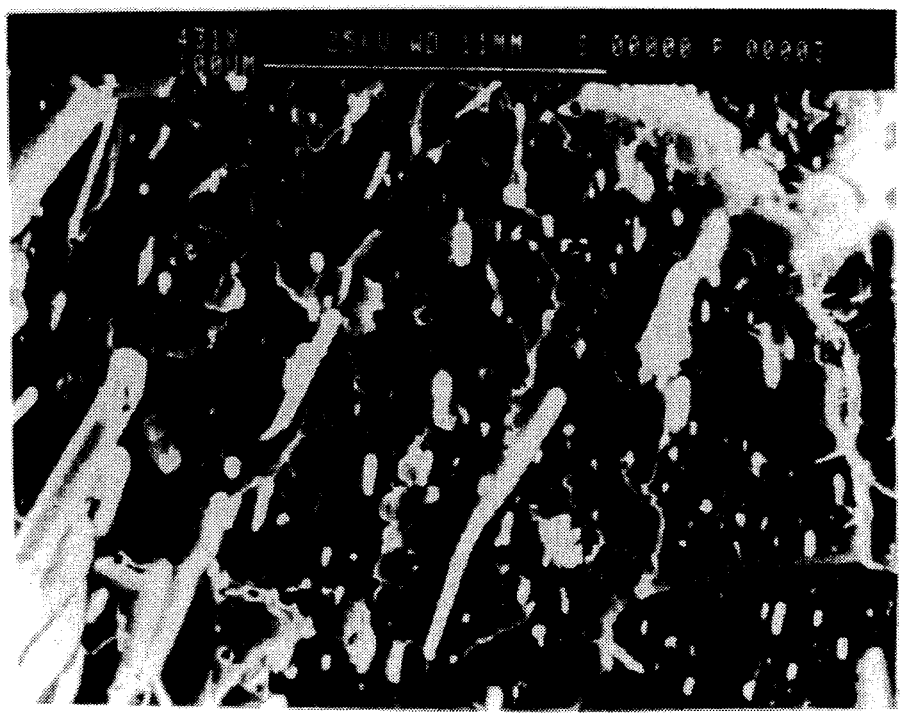

Scanning electron micrographs (SEM) were obtained to examine the polypropylene/Vectra B blends. FIGS. 2a–b show the fracture surface of the PP-I/Vectra B 88/12 blend at draw ratios of 39 and 11, respectively. Fibrils of Vectra B 950 are present within the polypropylene matrix; however, they exhibit poor adhesion as clearly indicated by the fiber pullout. FIGS. 3a–b show the fracture surface of the PP-III/Vectra B 88/12 blend at draw ratios of 43 and 10, respectively. Contrasting FIGS. 3a–b with FIGS. 2a–b, it can be seen that including maleated polypropylene in the blend results in both better dispersion and improved adhesion as evidenced by a lesser degree of fiber pullout. In addition, the SEMs show that the fracture has occurred within the liquid crystalline polymer fibrils for the blend with maleated polypropylene shown in FIGS. 3a–b rather than at the fibril-matrix interface as shown for the blend without maleated polypropylene shown in FIGS. 2a–b which is further evidence of improved adhesion between polypropylene and the liquid crystal polymer Vectra B 950 attributable to the addition of maleated polypropylene. Contrasting FIGS. 3a–b with FIGS. 2a–b, the differences in distribution of the liquid crystalline polymer show that the addition of maleated polypropylene leads to improved dispersion.

EXAMPLE 2

Injection molded plaques of polypropylene and Vectra B 950 blends with and without maleated polypropylene using the procedures described above for mixtures with compatible thermal processing ranges. Pelletized polypropylene/maleated polypropylene, 90% and 10% by weight in the pellet, respectively, were tumbled together with Vectra B 950 in predetermined weight ratios and fed to an injection molder. Likewise, polypropylene alone was tumbled together with Vectra B 950 in predetermined weight ratios and fed to an injection molder. The barrel temperatures of both the melting and melt pumping zones in the injection molder were 290° C., the nozzle temperature was 250° C., and the mold was kept at room temperature. The injection pressure was 1000 pounds per square inch (psi), the injection time was 2 seconds and the mold cooling time was 45 seconds. The approximate plaque dimensions were 75 mm by 80 mm by 1.75 mm. The plaques of blends of polypropylene and Vectra B 950, with and without maleated polypropylene, had the following compositions: PP-III/Vectra B 70/30, PP-III/Vectra B 80/20, PP-I/Vectra B 70/30, and PP-I/Vectra B 80/20. Plaques of polypropylene were also prepared.

The mechanical properties of the plaques were determined using test samples having approximate dimensions of 80 mm long and 12.5 mm wide in accordance with standard methods ASTM D638 for tensile tests and ASTM D790 for flex tests. FIG. 4 shows in tabular form the tensile and flex properties in the flow direction of the injection molded plaques. Adding only Vectra B 950 to polypropylene does result in some improvement of both the tensile and flex moduli over those determined for polypropylene alone, but results in decreased tensile strength (for both the 70/30 and 80/20 mixtures). Conversely, including maleated polypropylene in the Vectra B/polypropylene composition results in significant improvement in both tensile and flex moduli as well as tensile strength (for both the 70/30 and 80/20 mixtures). The enhanced modulus and strength of the PP-III/Vectra B blends as compared to the PP-I/Vectra B blends is indicative of better adhesion between the polypropylene and Vectra B.

Figure 5A:
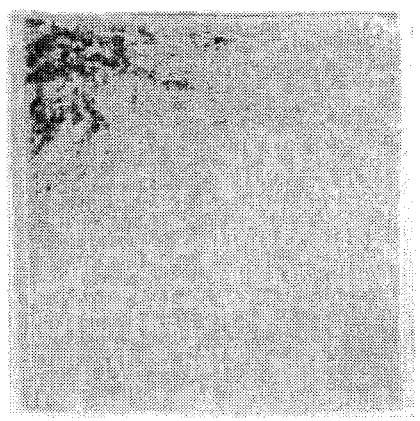
FIGS. 5a–b are photographs of the surfaces of the plaques of the polypropylene/Vectra B blends with and without maleated polypropylene, respectively.
Figure 5B:
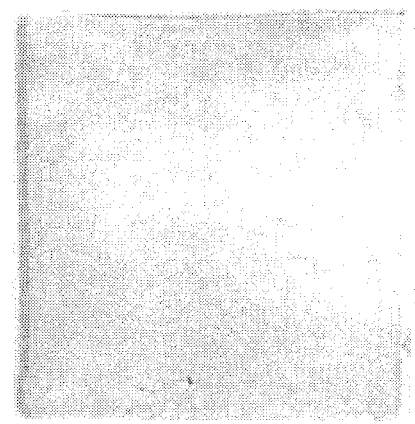
Figure 6A:
FIGS. 6a–b are scanning electron micrographs of the fracture surface of a mixture including 80 weight percent polypropylene and 20 weight percent liquid crystal polymer (PP-I/Vectra B 80/20)
Figure 6B:
Figure 7A:
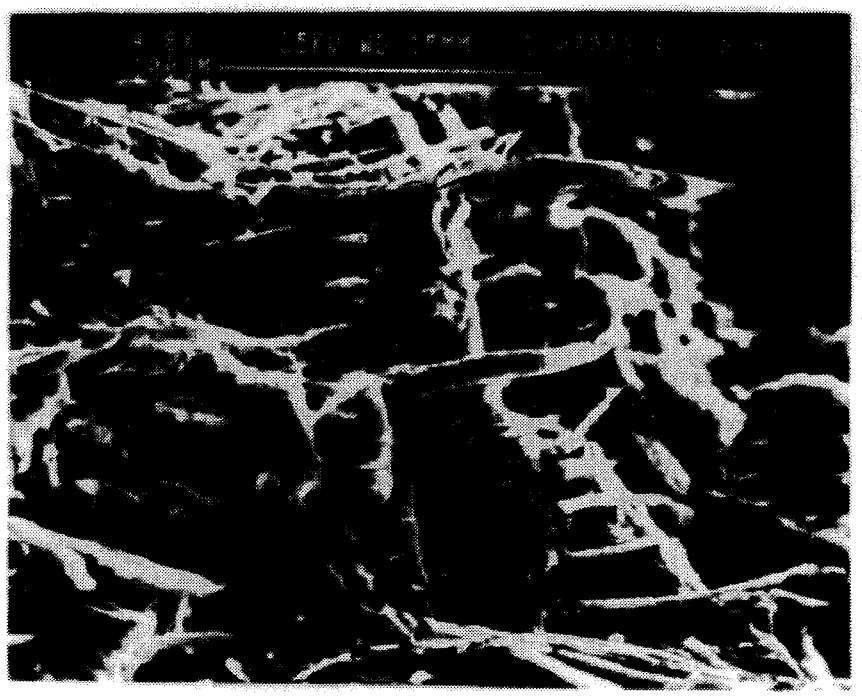
FIGS. 7a–b are scanning electron micrographs of the fracture surface of a mixture including 72 weight percent polypropylene, 8 weight percent maleated polypropylene, and 20 weight percent liquid crystal polymer (PP-III/Vectra B 80/20)
Figure 7B:

FIGS. 5a and 5b show a dramatic difference in the surface of the plaques of the polypropylene/Vectra B blends with and without maleated polypropylene. Unlike the blends without maleated polypropylene (as best shown in FIG. 5b), the blends with maleated polypropylene have a smooth and shiny surface and their appearance is much more homogenous. Moreover, there is no tendency for the materials to delaminate in the presence of maleated polypropylene. The smooth surface which results from the inclusion of maleated polypropylene should allow for the blend's use in parts which are subject to close consumer scrutiny.

FIGS. 6a–b and 7a–b show SEMs of the fracture surfaces of plaques for the PP-I/Vectra B 80/20 composition (no maleated polypropylene) and the PP-III/Vectra B 80/20 composition (includes maleated polypropylene). The two morphologies look similar with the presence of reinforcing liquid crystal polymer fibrils, but the fibrils are dispersed better (more evenly distributed and not bunched together) in the blend containing maleated polypropylene as compared to the blend without.

EXAMPLE 3

Injection molded plaques of polypropylene and Vectra A 900 (a liquid crystal polymer containing 73 mole % HBA and 27 mole % HNA) were made with and without maleated polypropylene using the procedures described above for materials with compatible thermal processing ranges. The method used to make the plaques was the same as that described in Example 2, except the Vectra A 900 component replaced the Vectra B 950 component. The plaques of blends of polypropylene and Vectra A 900, with and without maleated polypropylene, had the following compositions: PP-III/Vectra A 70/30, PP-III/Vectra A 80/20, PP-I/Vectra A 70/30, and PP-I/Vectra A 80/20. Plaques of polypropylene were also prepared.

The mechanical properties of the plaques were determined using test samples having approximate dimensions of 80 mm long and 12.5 mm wide in accordance with standard methods ASTM D638 for tensile tests. FIG. 8 shows in tabular form the tensile properties in the flow direction of injection molded plaques of blends of polypropylene and Vectra A with and without maleated polypropylene. While the addition of only Vectra A to polypropylene does result in some improvement in tensile modulus over that of polypropylene alone, the tensile strength is not appreciably changed at either blend composition (80/20 and 70/30). Conversely, the addition of maleated polypropylene to the blends of polypropylene and Vectra A 900 results in an improvement in both the tensile modulus and tensile strength for both blend compositions (80/20 and 70/30). The enhanced modulus and strength of the PP-III/Vectra A blends as compared to PP-I/Vectra A indicate better adhesion between polypropylene and Vectra A.

While the invention has been described in terms of its preferred embodiment where specific amounts of maleated polypropylene are added to particular weight percentage blends of polypropylene and liquid crystal polymers under specified conditions, the invention can be practiced with considerable modification and variation within the spirit and scope of the appended claims.

Having thus described our invention, what we claim as new and desire to secure by Letters Patent is the following:

1. A polymer alloy or blend comprising a polyolefin, a maleated polyolefin, and a liquid crystal polymer copolyester or polyester (coamide).

2. A polymer alloy or blend as recited in claim 1 wherein said polyolefin is polypropylene.

3. A polymer alloy or blend as recited in claim 1 wherein said maleated polyolefin is maleated polypropylene.

4. A polymer alloy or blend as recited in claim 1 wherein said liquid crystal polymer is a copolyester.

5. A polymer alloy or blend as recited in claim 4 wherein said liquid crystal polymer is a copolyester based on 2-hydroxy-6-naphthanoic acid and parahydroxybenzoic acid.

6. A polymer alloy or blend as recited in claim 1 wherein said liquid crystal polymer is a polyester (coamide).

7. A polymer alloy or blend as recited in claim 6 wherein said liquid crystal polymer is a polyester (coamide) based on 2-hydroxy-6-naphthanoic acid, terephthalic acid, and 4-hydroxy acetanilide.

8. A polymer alloy or blend as recited in claim 1 wherein said polymer alloy or blend is pelletized.

9. A polymer alloy or blend comprising polypropylene, maleated polypropylene, and a liquid crystal polymer copolyester or polyester (coamide).

10. A polymer alloy or blend as recited in claim 9 wherein said liquid crystal polymer is selected from the group consisting of a copolyester based on 2-hydroxy-6-naphthanoic acid and parahydroxybenzoic acid and a polyester (coamide) based on 2-hydroxy-6-naphthanoic acid, terephthalic acid, and 4-hydroxy acetanilide.

11. A polymer alloy or blend as recited in claim 9 wherein said maleated polypropylene is present in a weight percentage ranging from one tenth to ten percent, said polypropylene is present in a weight percentage ranging from one to ninety nine percent, and said liquid crystal polymer is present in a weight percentage ranging from one to ninety nine percent.

12. In a process for reinforcing polypropylene in situ with liquid crystal polymer fibers where polypropylene and liquid crystal polymer are combined together when each is in a molten state, the improvement comprising:

providing maleated polypropylene to compatabilize said polypropylene and a liquid crystal polymer copolyester or polyester (coamide).

13. A method of using maleated polypropylene as a compatabilizing agent, comprising the step of providing a polymer blend of polypropylene and a liquid crystal polymer copolyester or polyester (coamide) with a quantity of maleated polypropylene.

14. A method as recited in claim 13 wherein said maleated polypropylene is combined with said polypropylene before said polypropylene is blended with said liquid crystal polymer copolyester or polyester (coamide).

15. A polymer alloy or blend comprising a polyolefin and a maleated polyolefin, both of which are processable in a first temperature range, and a liquid crystal polymer copolyester or polyester (coamide) which is processable in a second temperature range, said first temperature range not overlapping said second temperature range.

* * * * *